No. 785,489.

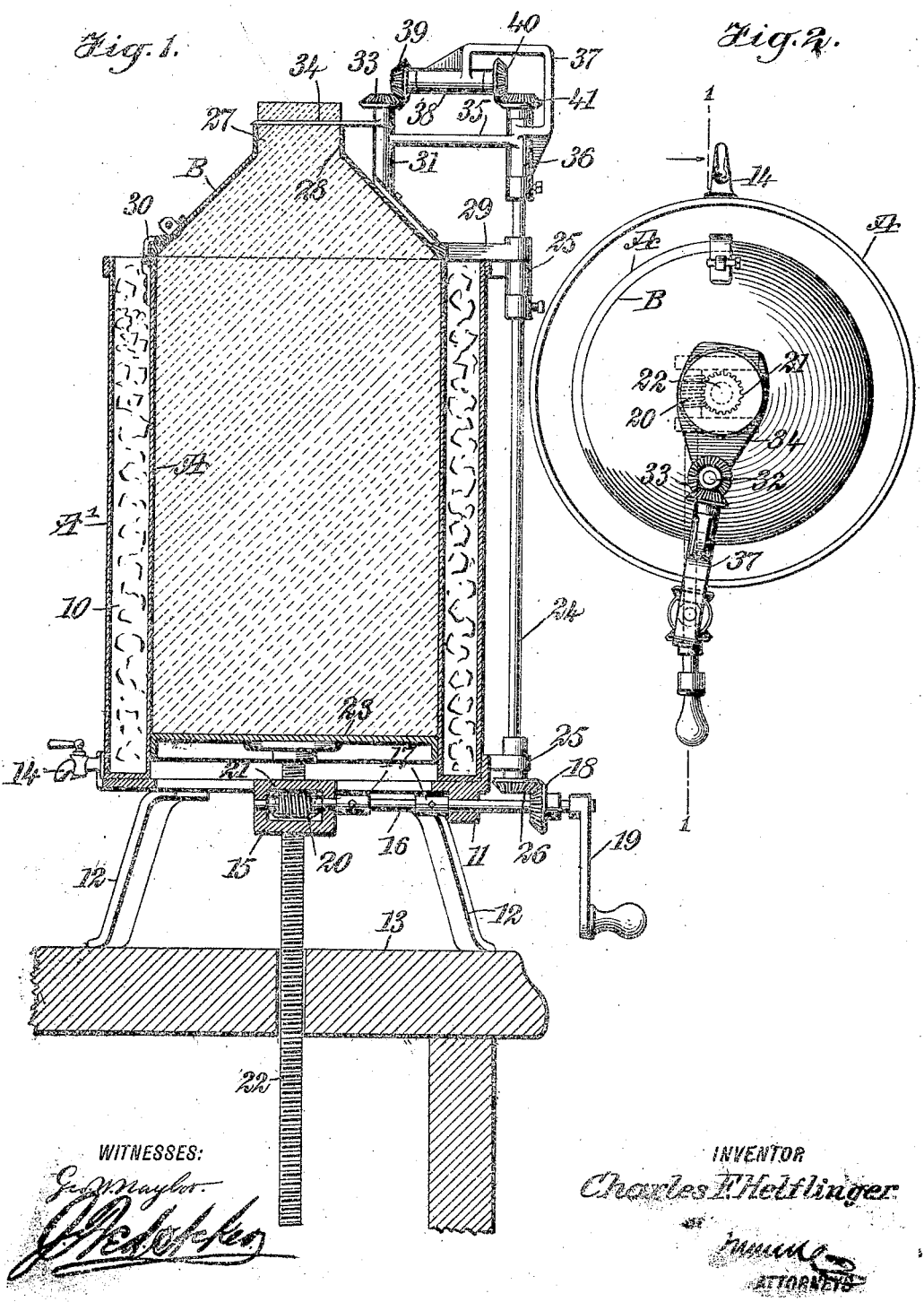

Patented March 21, 1905.

UNITED STATES PATENT OFFICE.

CHARLES F. HELFLINGER, OF GRAND RAPIDS, WISCONSIN.

BUTTER-CUTTING MACHINE.

SPECIFICATION forming part of Letters Patent No. 785,489, dated March 21, 1905.

Application filed December 9, 1904. Serial No. 236,128.

*To all whom it may concern:*

Be it known that I, CHARLES F. HELFLINGER, a citizen of the United States, and a resident of Grand Rapids, in the county of Wood and State of Wisconsin, have invented a new and Improved Butter-Cutting Machine, of which the following is a full, clear, and exact description.

The purpose of the invention is to provide a machine for cutting pats of butter from bulk, which machine is not only of simple and durable construction, but can be conveniently and expeditiously operated to continuously feed a mass of butter to a predetermined outlet and cut from the mass that portion of the butter which is pressed through the outlet.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a central vertical section through the machine, taken practically on the line 1 1 of Fig. 2; and Fig. 2 is a plan view of the machine.

A represents a receptacle of any desired shape. Preferably, however, the said receptacle is circular in cross-section and is open at the top and at the bottom. The receptacle A is inclosed by a jacket A', forming thereby an outer chamber 10, which can be packed with ice or a refrigerating and cooling material, and the said chamber is open at the top and closed at the bottom. The jacketed receptacle A is supported by a base 11 of any suitable form, which base is provided with legs 12, adapted to rest upon a table 13 or other support. A faucet 14 is located at the bottom portion of the said chamber 10 for the purpose of withdrawing liquid therefrom.

A box 15 is formed at the central portion of the base 11, and the inner end of a shaft 16 is journaled in the said box and likewise in bearings 17, attached to the base 11, as is shown in Fig. 1. The said shaft 17 extends beyond the outer face of the jacketed receptacle A, terminating at its outer end in a handle 19, preferably a crank-handle, and at the handle end of the shaft 16 a bevel-gear 18 is secured. A worm 20 is formed on the shaft 16 within the box 15, and the said worm 20 meshes with a worm-wheel 21, also located within the said box, and the said worm-wheel 21 is interiorly threaded and is made to receive a threaded rod 22, which rod extends downward from the box, and when the jacketed receptacle is on a table 13, for example, the threaded rod 22 passes through the said table. The upper end of the said threaded rod 22 is connected with a follower 23, and the follower as the rod 20 is moved up and down through the instrumentality of the worm and worm-wheel described travels up and down in the jacketed receptacle A, and the mass of butter when placed in the said jacketed receptacle rests at its bottom on the follower 23.

A vertical shaft 24 is located at one side of the jacketed receptacle A, being mounted to turn in suitable bearings 25, secured to the jacket of the receptacle, as is shown in Fig. 1, and the shaft 24 is provided with a bevel-gear 26 at its lower end, meshing with the gear 18 on the shaft 16.

The receptacle A is provided with a top section B, removable therefrom, and the said top section B is preferably of conical form and at its apex is provided with an outlet 27, and the material of the top section B at the said outlet is preferably vertically disposed, as is shown at 28 in Fig. 1. This upper section B is provided with a hinge member 29, adapted to turn readily on the vertical shaft 24, and the said upper member B is likewise provided with a catch 30, of any approved form, whereby the said upper member or section may be firmly secured in position over the receptacle A. A tubular bearing 31 is secured to the upper member B of the said receptacle, extending upward from the side portion thereof, and a shaft 32 is mounted to turn in the said bearing 31. The shaft 32 is provided at its upper end with a bevel-gear 33. The hub portion of said gear 33 is attached to or is integral with a horizontal blade or knife 34, which as the shaft 32 revolves passes over the outlet 27 of the upper member B of the receptacle and cuts off that portion of the material in the receptacle A forced out through the said outlet by the upward movement of the follower 23.

A horizontal brace-rod 35 is carried out from the bearing 31, and this brace-rod 35 is integral with or is attached to a vertical sleeve 36, in which the upper end of the vertical shaft 24 is free to turn, and a bracket 37 extends upwardly and forwardly from the sleeve 36, the said bracket 37 being made to support a horizontal sleeve 38, in which a short shaft is mounted to turn, having a gear 39 at one end meshing with the gear 33, above referred to, and a gear 40 at the other end meshing with a gear 41 at the upper end of the shaft 24, all the gears mentioned being bevel-gears. Thus it will be observed that by turning the shaft 16 the material in the receptacle A is forced upward and out through the outlet 27, and at the same time the knife 34 is horizontally revolved to cut from the mass within the receptacle A and its cover B the material pressed through the outlet 27, thereby forming a series of pats of butter as the knife 34 revolves.

Having thus described my invention, I claim as new and desire to secure by Letters Patent—

1. In a machine for cutting butter, a receptacle having an outlet-opening, a follower mounted for movement in the said receptacle, a knife adapted for movement over the outlet of the receptacle, a base on which the receptacle rests, a boxing carried by the base, a main shaft journaled in the boxing, a threaded rod extending down from the follower, a driving connection between the main shaft and the threaded rod and located in the boxing, and a driving connection between the main shaft and the said knife.

2. In a machine for cutting butter, a receptacle, a cover for the said receptacle, removable therefrom and provided with a contracted outlet portion, a knife operatively supported above the outlet for the said cover, the knife being capable of horizontal rotary movement, a follower mounted to slide in the body of the receptacle, a base on which the receptacle rests, a boxing carried by the base, a main shaft journaled in the said boxing and provided with a worm within the said boxing, a threaded rod extending down from the follower and through the boxing, a worm-wheel threaded to receive the said rod and located within the boxing, being in engagement with the said worm, and driven shafts operatively connected with the main shaft and with the axis of the said knife, as described.

3. In a machine for cutting butter, a receptacle, a support for the same, a cover for the said receptacle having a contracted opening, a follower located within the receptacle, a main shaft mounted to turn in the support for the receptacle, means for operating the follower from the main shaft, a knife adapted for movement over the contracted outlet of the receptacle, a vertical shaft driven from the main shaft, driving connections between the vertical shaft and the said knife, the said cover for the receptacle having a hinge member mounted to turn on the said vertical shaft, and a catch for securing the cover in position over the receptacle.

4. In a machine for cutting butter, a receptacle open at the top and at the bottom, a cover for the open top of the receptacle having an outlet-opening, a jacket inclosing said receptacle and open at the top and closed at the bottom, the jacket forming an outer chamber for cooling material, a base supporting said jacketed receptacle, a follower located within the receptacle, a knife located at the upper portion of the receptacle and adapted for movement over the outlet thereof, and means for simultaneously operating the knife and the follower.

5. In a machine for cutting butter, a receptacle, a cover for the receptacle having a contracted outlet portion, a follower mounted for movement in the receptacle, a main shaft, connections between the main shaft and follower for operating the latter, a shaft located at one side of the receptacle and driven from the main shaft, the said cover having a hinge member mounted to turn on said shaft, a knife mounted to turn on the cover of the receptacle and having movement over the outlet of the cover, and driving connections between the shaft at the side of the receptacle and said knife.

In testimony whereof I have signed my name to this specification in the presence of two subscribing witnesses.

CHARLES F. HEIFLINGER.

Witnesses:
HERMAN WIPPERMAN,
ELEANORE SLATTERY.